United States Patent [19]

Boehringer

[11] 3,821,950
[45] July 2, 1974

[54] RESPIROMETER

[76] Inventor: John R. Boehringer, 427 Parkview Dr., Wynnewood, Pa. 19096

[22] Filed: Nov. 15, 1972

[21] Appl. No.: 306,549

[52] U.S. Cl. ............................................. 128/2.08
[51] Int. Cl............................................... A61b 5/08
[58] Field of Search ............ 128/2.08; 222/95, 102, 222/103

[56] References Cited
UNITED STATES PATENTS

| | | | |
|---|---|---|---|
| 392,711 | 11/1888 | Barton | 128/2.08 |
| 2,083,603 | 6/1937 | Harwick | 222/95 |
| 2,427,145 | 9/1947 | Koehler et al. | 128/2.08 |
| 2,790,579 | 4/1957 | Woldorf | 222/103 |

OTHER PUBLICATIONS

E. A. Cooper et al., "A Bag For Measuring Respiratory Volumes," The Laucet, Feb. 13, 1960, p. 369.

*Primary Examiner*—Aldrich F. Medbery
*Attorney, Agent, or Firm*—Paul & Paul

[57] ABSTRACT

Elongated, air tight, flexible bag for measuring respiratory volume is attached at one end to a roller having a passageway therethrough which communicates with the interior of the bag and with a means for receiving expiratory gas from a test subject, and which further includes an easily closable opening, requiring deliberate closure during use, to prevent suffocation of an incapacitated test subject. In its preferred form, the bag includes a relatively inflexible corrugated structure opposite that part of the bag in communication with the interior of the roller passageway to prevent excessive back pressure. Preferably, the calibration markings are devised so that measurement is taken by progressively collapsing the bag beginning at one end thereof while holding the bag against a flat surface and proceeding toward the opposite end of the bag until the internal pressure in the uncollapsed portion of the bag causes a distention of the bag away from the flat surface. This specific method of measuring respiratory volume is also within the scope of the present invention.

13 Claims, 2 Drawing Figures

PATENTED JUL 2 1974
3,821,950
SHEET 1 OF 2
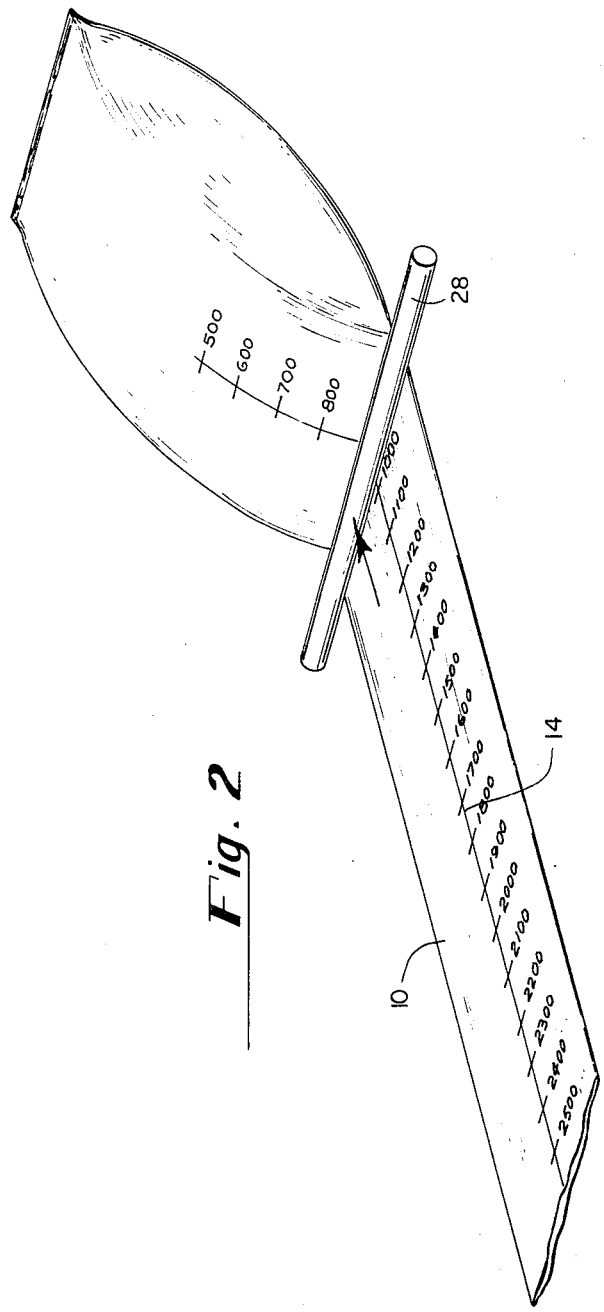
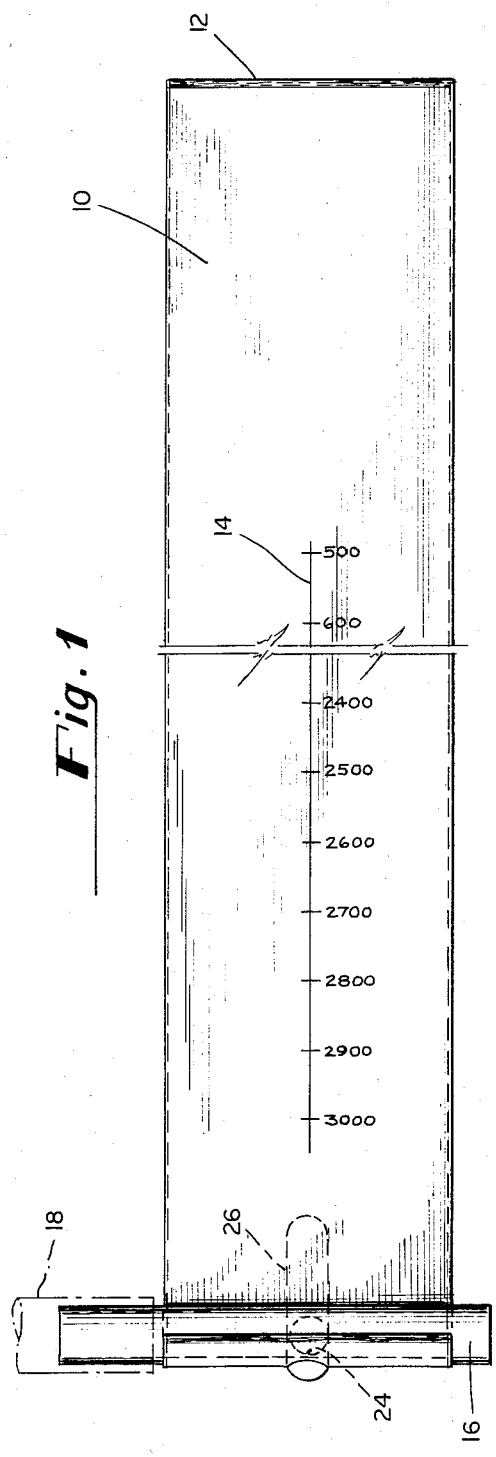

RESPIROMETER

This invention pertains to a simple, economical, sanitary, safe, and reliable device for measuring respiratory volume and to a method of measuring such volumes, which method also has the above-cited desirable characteristics.

A large variety of devices and methods for measuring respiratory volume have been taught in the prior art. The approaches utilized in such devices and methods have varied from measurement of liquid displacement to complex turbo meters. The simplest approach, however, and that thought to lend itself best to maintenance of sanitary conditions by facilitating economical manufacture of disposable measurement devices, has been the use of inflatable bags combined with various means for measuring the expiratory gas entrapped therein.

Two such devices are those disclosed in U.S. Pat. No. 392,711 - Barton and the article entitled, "A Bag For Measuring Respiratory Volumes" by E. A. Cooper and E. A. Pask in "The Lancet," Feb. 13, 1960, Page 369.

Even these devices, however, which applicant deems more useful and more practical than other known devices in the prior art, have certain inherent disadvantages. For example, neither Barton nor The Lancet article discloses a device with any sort of fail-safe mechanism to prevent suffocation of an incapacitated test subject. Similarly, the device disclosed in The Lancet article is relatively inconvenient because of the use of opposite ends of the elongated bag to attach the holding mechanism and the air inlet mechanism. The Barton device, in which the air inlet and holding mechanism or roller, are on the same end of the elongated bag is free of this disadvantage but has the further disadvantage that the air inlet into the bag may become sealed by static electricity or adhesion holding the side of the bag opposite the inlet opening against the inlet opening, thus causing excessive back pressure.

More importantly, neither these particular devices nor any other known devices for measuring respiratory volume, particularly including those based on an inflated bag concept, provide for a simple and expedient method for reliably measuring the volume of the gas entrapped therein.

Accordingly, it is the general object of the present invention to provide a respiratory volume measuring bag with appropriate associated mechanisms and calibration markings to preclude inadvertent suffocation of an incapacitated test subject, to facilitate reliable and reproducible operation of the device, and to permit reliable and expeditious, as well as simple, measurement of gas volume in the bag.

This general object and other specific objects, which will be apparent from the subsequent discussion of this invention, are met by an elongated, air tight, flexible bag, one end of which is permanently closed and the other end of which is attached to a roller having an interior passageway communicating with the interior of the bag and with a means for receiving expiratory gas from a test subject, and further including an easily closable opening to the atmosphere, the simplest embodiment of which is a simple hole about 0.6 inches in diameter, which may be easily closed by the exertion of simple finger pressure. This easily closable opening constitutes a fail-safe mechanism in that the opening must be deliberately kept closed during use of the bag and can be conveniently closed by either the test subject or the person administering the test.

In the preferred form of the present invention, the roller to which the bag is attached constitutes a holding mechanism upon which the bag is rolled during storage and the roller is simply a cylindrical tube open at one end, which is small enough to be covered by a human finger; generally a hole or tube opening of about 0.6 inches or less in diameter will suffice. Also, in the preferred embodiment of the invention, the bag includes a relatively inflexible corrugated structure on the side thereof opposite the opening of the bag to the interior passageway of the roller. This facilitates passage of expiratory gases into the bag and prevents excessive back pressure due to sealing of the bag against the interior opening, such as may be caused by static electricity or adhesion of the two sides of the bag.

One important aspect of the present invention is the method by which the gas volume enclosed in the bag is measured and the calibration markings on the bag to facilitate such measurement. In this method, a relatively inflexible member extending across the width of the bag is used to progressively collapse the bag beginning at one end thereof and proceeding toward the opposite end thereof until the internal pressure in the uncollapsed portion of the bag is sufficiently great to cause distention of the bag away from a flat surface against which the inflexible member presses the bag. The inflexible member upon which the bag is collapsed may be the roller to which the bag is attached. Thus the progressive bag collapse may be effected by rolling the bag on its roller toward the closed end of the bag until the desired degree of distention is reached. Depending on the bag materials, the amount of distention required is taken into account in imprinting the calibration markings on the bag. However, the amount of this distention is generally not critical.

For better understanding of the invention, reference is made to the claims appended hereto taken in conjunction with the detailed description which follows and the attached drawings, in which:

FIG. 1 is a top view of the extended bag and its attached roller prior to testing or inflation;

FIG. 2 is a perspective view of the bag after it has been progressively collapsed to the point where the uncollapsed portion is distended away from a flat surface against which the bag is pressed;

Figure 3:
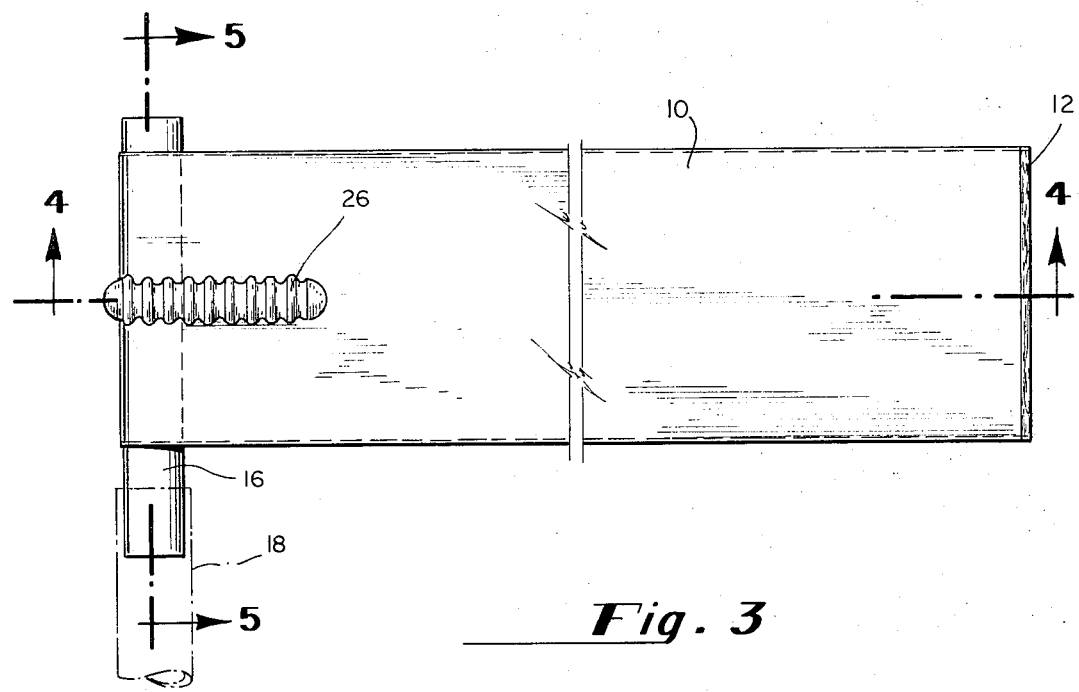
FIG. 3 is a bottom view of the bag in its extended form along with the roller to which it is attached.

Referring more specifically to FIG. 1, there is shown an elongated, air tight, flexible bag 10 closed at one end 12 having calibration markings thereon 14 and attached at the opposite end to a roller 16 adapted to be attached to a means 18, for receiving expiratory gas from a test subject, which is shown in phantom.

Figure 4:
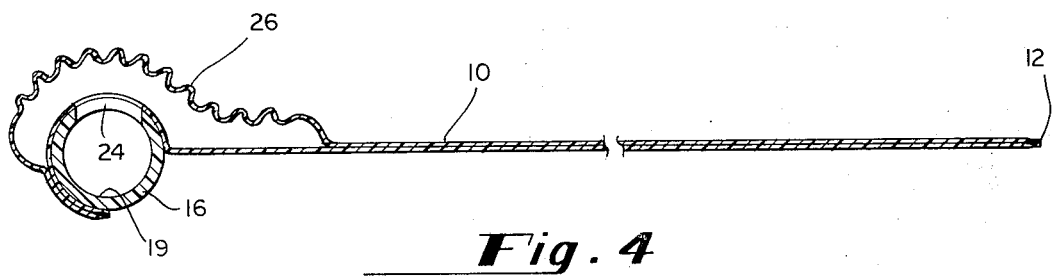
FIG. 4 is a side sectional view of the bag prior to its inflation.
Figure 5:
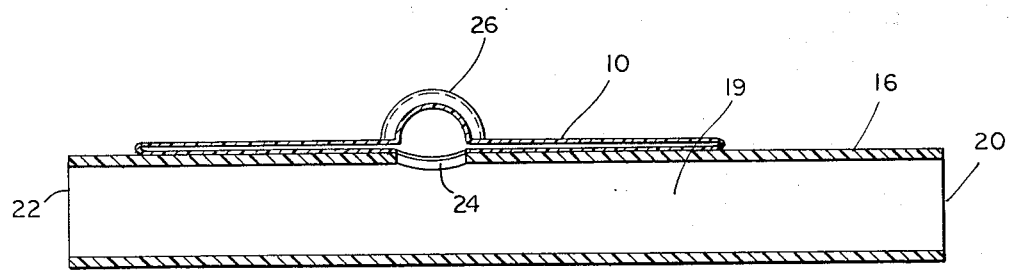
FIG. 5 is a sectional view of the roller and the bag attached thereto prior to any inflation thereof.

In the preferred form of the present invention, as better seen in FIGS. 4 and 5, roller 16 consists of a hollow cylindrical roller tube, the hollow interior of which comprises an interior passageway 19 adapted to communicate with the expiratory gas inlet means 18 at one end 20 and open at the other end 22 to provide an easily closable gas escape means which provides a fail-safe mechanism for preventing inadvertent suffocation of an incapacitated test subject. In use, the test subject or a person administering the test closes opening 22 by covering the opening with a finger. Referring specifically to FIGS. 4 and 5 again, it will be noted that interior passageway 19 also communicates through opening 24 with the interior of bag 10. To prevent sealing of the opposite side of bag 10 against opening 24, bag 10 is provided in the preferred embodiment of the present invention with a relatively inflexible corrugated structure 26 in the area opposite opening 24. Thus, though bag 10 may be rolled up on roller 16 for a considerable period of time in storage and would ordinarily consist of some synthetic material such as polyethylene which might tend because of chemical adhesion or static electricity to have one side of bag 10 stuck to the other side thereof and thereby cause excessive back pressure on expiratory gas attempting to enter bag 10 through opening 24, corrugated structure 26 prevents such excessive back pressure and facilitates entry of expiratory gas through opening 24 into the interior of bag 10.

As illustrated in FIG. 2, the method of measuring respiratory volume in accordance with the present invention consists of pressing one end of the bag against a flat surface with an inflexible member 28 extending across the width of bag 10 beginning at one end thereof and gradually moving the inflexible member towards the opposite end of the bag continuing to press the bag against the flat surface until the uncollapsed or inflated portion of the bag is distended away from the flat surface. FIG. 2 shows the bag 10 and member 29 at the end of this procedure with bag 10 in distended condition.

Generally, the amount or degree of this distention may be in the range of from about 10° to about 45°, this being the angle between the longitudinal axis of elongated bag 10 and the flat surface against which it is pressed by inflexible member 28. These angles, however, are not critical in that once the inflated portion of bag 10 begins to be distended away from the flat surface, very little movement of inflexible member 28 causes a considerable change in this degree of distention. Thus, while calibration markings 14 on bag 10 must take into account the flexibility of the bag and the method of measurement including the distention of the inflated portion away from a flat surface, relatively little calibration error is introduced by the inaccuracy of the angular inclination of the distended bag. Nevertheless, it would be obvious to those skilled in the art that one using the device or method of this invention would generally attempt to approximate the same degree of distention or angular inclination in repetitive tests. In the preferred embodiment of this invention, polyethylene of 4 mil thickness is used as the bag material and a distention angle of about 30° from the flat surface is recommended. Use of a more yieldable or more elastic bag material is not recommended since this would complicate calibration of bag volume.

In a preferred method of measuring respiratory volume in accordance with the present invention, the bag roller is used as the inflexible member. Progressive bag collapse is accomplished by rolling the bag onto its roller while keeping the roller and bag against a flat surface. The position of the roller, with part of the bag rolled thereon, when the inflated or non-collapsed portion of the bag is distended from the surface to some preselected degree, say 30°, is a direct indication of the respiratory volume to be measured.

In operation, inflexible member 28 may also consist of any tubular or rod shaped device, the most common example of which is a pencil, or a human hand.

Bag 10 generally may consist of any film material but a synthetic material, such as polyethylene, in some conventional thickness such as 3 to 6 mils, is preferred; as indicated above, a yieldable or elastic material is to be avoided. The relative proportions of the bag will be such that the elongated dimension will be sufficiently great as compared to the width dimension of the bag so that the calibration markings along the length of the bag will be sufficiently spaced to permit relatively accurate measurement of bag volumes throughout the range of expiratory volumes normally expected in test subjects of the type for which the bag is intended. In the case of human subjects, the test volume of the bag would generally range from 500 to 3,000 cubic centimeters, the length of the bag would generally be from 1 to 4 feet and the width of the bag would generally be 6 inches or less. Bag volumes of as little as 100 cc or as much as 7,000 cc may be desirable for specific purposes and may obviously be constructed in accordance with this invention. The bag of this invention may also include Velcro or some other means to attach it to an individual patient's bedside or to identify it with a particular patient.

Calibration markings or a nomograph may also be provided to relate bag volume to breathing rate and thereby to obtain an indication of tidal volume (total volume per unit time).

While this invention has been described with respect to specific embodiments thereof, it should be understood that the devices and methods of this invention are not limited to these embodiments and the appended claims are intended to cover all such equivalent modifications and variations of the invention which come within the true spirit and scope thereof.

I claim:

1. A device for measuring respiratory volume comprising an elongated, air tight, flexible bag, one end of which is permanently sealed, the other end of which is attached to a roller having a passageway means therethrough, said passageway means communicating with the interior of said bag and including a means for receiving expiratory gas from a test subject, said passageway means further including a second means selectively defining a closable opening to the atmosphere, and constituting, when open, an inhalation and exhalation means.

2. A device, as recited in claim 1, wherein said closable opening consists of a hole about 0.6 inches or less in diameter.

3. A bag and roller, as recited in claim 1, wherein said roller is a cylinder, one end of which is open to the atmosphere through an opening about 0.6 inches or less in diameter.

4. A device, as recited in claim 1, wherein said passageway communicates with the interior of said bag through an opening in one side of said bag, the side of said bag opposite said opening including a relatively inflexible corrugated structure.

5. A device, as recited in claim 1, wherein said bag includes calibration markings along the length thereof.

6. A device, as recited in claim 5, wherein said flexible bag is also relatively non-yieldable and each of said calibration markings indicate the volume of gas entrapped in said bag in a first portion thereof between said marking and said sealed end of said bag when the remaining portion of said bag is collapsed and the pressure within said first portion of said bag is sufficiently great to cause inflation thereof and a preselected amount of distention of said inflated portion of said bag away from a flat surface when said bag is held at said calibration marking against said flat surface and across the width of said elongated bag.

7. A device, as recited in claim 6, wherein said closable opening comprises a hole about 0.6 inches or less in diameter.

8. A device, as recited in claim 6, wherein said passageway communicates with the interior of said bag through an opening in one side of said bag, the side of said bag opposite said opening including a relatively inflexible corrugated structure.

9. A device, as recited in claim 8, wherein said closable opening comprises a hole about 0.6 inches or less in diameter.

10. A device for mesuring respiratory volume consisting of an elongated, air tight, flexible bag, one end of which is permanently sealed, the other end of which is attached to a roller having a passageway therethrough, said passageway communicating with the interior of said bag and with a means for receiving expiratory gas from a test subject, said passageway further including a first closable opening to the atmosphere, said passageway communicating with the interior of said bag through a second opening in one side of said bag, the side of said bag opposite said second opening including a relatively inflexible corrugated structure.

11. A device, as recited in claim 10, wherein said closable opening consists of a hole about 0.6 inches or less in diameter.

12. A device for measuring respiratory volume consisting of an elongated, air tight, flexible bag, one end of which is permanently sealed, the other end of which is attached to a roller having a passageway therethrough, said passageway communicating with the interior of said bag and with a means for receiving expiratory gas from a test subject, said passageway further including a closable opening to the atmosphere, said bag including calibration markings along the length thereof, and wherein said flexible bag is also relatively non-yielding and each of said calibration markings indicate the volume of gas entrapped in said bag in a first portion thereof between said marking and said sealed end of said bag when the remaining portion of said bag is collapsed and the pressure within said first portion of said bag is sufficiently great to cause inflation thereof and a preselected amount of distention of said inflated portion of said bag away from a flat surface when said bag is held at said calibration marking against said flat surface and across the width of said elongated bag, and further wherein said passageway communicates with the interior of said bag through a second opening in one side of said bag, the side of said bag opposite said second opening including a relatively inflexible corrugated structure.

13. A device, as recited in claim 12, wherein said closable opening comprises a hole about 0.6 inches or less in diameter.

* * * * *